(12) United States Patent
Hovey et al.

(10) Patent No.: US 10,723,455 B1
(45) Date of Patent: Jul. 28, 2020

(54) AERIAL SHOW SYSTEM WITH DYNAMIC PARTICIPATION OF UNMANNED AERIAL VEHICLES (UAVS) WITH DISTRIBUTED SHOW SYSTEMS

(71) Applicant: DISNEY ENTERPRISES, INC., Burbank, CA (US)

(72) Inventors: Pehr L. Hovey, Highland Park, CA (US); Madeline R. Zupan, Burbank, CA (US); Anthony Paul Dohi, Pasadena, CA (US); David Loyal Christensen, Glendale, CA (US); Jon Hayes Snoddy, Pasadena, CA (US); Morgan T. Pope, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/558,517

(22) Filed: Sep. 3, 2019

(51) Int. Cl.
*B64D 1/02* (2006.01)
*B64C 39/02* (2006.01)
*A63J 5/02* (2006.01)
*B64D 1/18* (2006.01)

(52) U.S. Cl.
CPC ............. *B64C 39/024* (2013.01); *A63J 5/02* (2013.01); *B64D 1/02* (2013.01); *B64C 2201/027* (2013.01); *B64C 2201/12* (2013.01); *B64C 2201/143* (2013.01); *B64D 1/18* (2013.01)

(58) Field of Classification Search
CPC ....... B64C 19/00; B64C 39/00; B64C 39/024; B64C 27/08; B64D 1/00; B64D 1/02; B64D 47/00; B64D 47/06; G08G 5/04; G08G 5/0034; G08G 5/0069
USPC ......... 472/59–61, 130, 137; 446/34–36, 175, 446/219
See application file for complete search history.

(56) References Cited

U.S. PATENT DOCUMENTS

| | | | | |
|---|---|---|---|---|
| 8,876,571 | B2 * | 11/2014 | Trowbridge | A63H 27/12 446/84 |
| 10,424,231 | B2 * | 9/2019 | Salem | G09F 21/12 |
| 2014/0249693 | A1 * | 9/2014 | Stark | B64D 47/02 701/2 |
| 2019/0315486 | A1 * | 10/2019 | Martin | H05B 47/105 |

\* cited by examiner

*Primary Examiner* — Kien T Nguyen
(74) *Attorney, Agent, or Firm* — Snell & Wilmer LLP; Kent A. Lembke (57) ABSTRACT

An aerial show system that includes unmanned aerial vehicles (UAVs), show systems onboard the UAVs, non-UAV or "ground" show systems, and a global ground control system. The control system is configured to actively track a UAV's operations during a show performance and to react to make the UAV truly a part of the larger show performance. The system achieves dynamic show participation of the UAV with the distributed show systems, which may include other UAVs and non-UAV show systems on the ground but launch or provide effects in the airspace through which the UAV flies. For example, the control system may track a UAV with a show effect element to determine whether the UAV properly hits its cue or mark with respect to position and orientation in the show space and with respect to timing and, in response to location tracking, trigger show effects early, late, or on time.

27 Claims, 5 Drawing Sheets

AERIAL SHOW SYSTEM WITH DYNAMIC PARTICIPATION OF UNMANNED AERIAL VEHICLES (UAVS) WITH DISTRIBUTED SHOW SYSTEMS

BACKGROUND

1. Field of the Description

The present description relates, in general, to aerial shows or displays, and, more particularly, the description relates to a new system (and associated control methods) adapted for providing a dynamically-coordinated show (e.g., coordinated between airborne and ground devices) to entertain guests of a facility such as a theme park, an outdoor sporting stadium, and so on. The system includes distributed show systems and human actors as well as unmanned aerial vehicles (UAVs), which that are tracked, monitored, and controlled to provide dynamic show participation with the distributed show system and human actors.

2. Relevant Background

There is a strong demand for new ways to provide shows or displays in the sky. These shows and displays may be provided, for example, to crowds of people visiting a theme or amusement park. In other cases, an airborne display or show is provided to sports fans before or after a sporting event or even at halftime or another break.

Show and display designers have begun to use unmanned aerial vehicles (UAVs), such as quadcopters, as part of a show or to carry a portion of show's aerial components. UAVs present numerous opportunities to creatively enhance a theatrical show production. However, they are typically operated as nearly independent systems that may fly to a pre-programmed pattern. Particularly, to date, the UAVs generally have been controlled through execution of a pre-programmed set of movements, such as to carry out a predefined flight plan, over a space. The UAVs used in shows are otherwise disconnected from the live performance cadence of the rest of the production such as performances by human actors, triggering of ground-based show or display systems, and/or movements and operations of other UAVs in the show space.

Modern aerial display or show productions have increasingly complex human performance and show effects, and, to date, it has proven very difficult to synchronize these elements with UAV pre-programmed flight paths. The show production may be simplified to make a UAV appear to hit certain marks at the same time as other show elements, and this lack of tight synchronization may cause the appearance of UAVs within an aerial display or show to be perceived as arbitrary and disjointed.

SUMMARY

In brief, an aerial show system is provided that includes unmanned aerial vehicles (UAVs), show systems onboard the UAVs (including any carried or moved by the UAVs), human actors or show participants, non-UAV or "ground" show systems, and a global ground controller or system system(s). UAV, in this description, includes any unmanned object that is airborne in a show space such as copters, drones, ballistic objects (which may include robotic devices launched into the air or dropped from a flying object, a raised platform, or otherwise from a height to fly through show's airspace, and so on. The global ground-based control system is configured with hardware and software (e.g., a global controller module) to actively track a UAV's operations during a show performance and, in response, to react to and act on the UAV to make the UAV truly a part of the larger show performance or experience. The new aerial show system overcomes deficiencies with reliance on having a UAV with onboard show effect elements simply follow a pre-programmed flight plan. Instead, the new system achieves dynamic show participation of the UAV with the distributed show systems, which may include other UAVs with show effect elements, human actors on the ground or in the air, and non-UAV show systems that may be on the ground but launch or provide effects in the air space through which the UAV flies during a show performance.

For example, the global ground-based control system may track a UAV with a show effect element (or onboard show system with one, two, or more show effect elements and show effect elements each may include robotic subsystems or components) to determine whether the UAV properly hits its cue or mark with respect to position and orientation in the show space and with respect to timing (e.g., is the speed and direction of travel of the UAV correct to provide proper time synchronization with operation of other show systems and/or show effect elements). If "yes" a cue/mark is hit, the ground-based control system may trigger a first effect(s) by one or more show systems, but, if "no" because a cue/mark was missed by the tracked UAV, the ground-based control system may trigger a second effect(s) (or third effect and so on) provided by one or more show systems (the same or differing ones than used for providing the first effect(s)). During operation of the new aerial show system, the ground-based control system is wholly aware of the UAVs used in the show space and each of these communicate with each other and with the ground to facilitate monitoring operations and show effect triggering operations by the ground-based control system.

More particularly, a system is provided that is adapted for achieving dynamic participation of unmanned aerial vehicles in a distributed air and ground show. The system includes a ground-based show control system generating triggering signals for triggering show effects based on an ideal timeline defined for the distributed aerial show. Each UAV includes a flight controller and, optionally in some cases, a flight propulsion mechanism operable to move the UAV in three dimensions in a show airspace. Further, the system includes: (a) one or more show effect devices physically separated from the UAV and operable in response to the triggering signals to generate a first show effect; and (b) one or more show effect devices physically on or supported by the UAV and operable in response to the triggering signals to generate a second show effect. During system operations, the first and second show effects interact to generate a cumulative or complete show effect.

In some embodiments, the UAV further includes an onboard show controller with computation resources executing a script to generate show control signals for the one or more show effect devices physically on or supported by the UAV based on the show control signals. In such embodiments, the script may be or include a mini-scene including a musical score or lighting cues triggered and mixed based on an actual location of the UAV in the show space to maintain synchronization of the distributed aerial show over the timeline. The mini-scene can be uniquely configured for ending early or late on the timeline to suit the actual location of the UAV.

In the same or other embodiments of the system, the ground-based show control system generates the triggering signals based on timing of the UAV traveling to or through a location in the airspace with respect to timing and a mark location defined in the timeline for the distributed aerial show. The system may also include a tracking device coupled to the ground-based show control system tracking a relative position of the UAV and the show effect devices physically separated from the UAV, and the relative position may be used by the ground-based show control system to select a time for issuing the triggering signals. Also, the relative position may be used by the ground-based show control system to generate the triggering signals to cause the one or more show effect devices physically separated from the UAV to provide illumination or projections towards the UAV as the UAV is moved through the show airspace by the propulsion mechanism. Additionally, the tracking device may determine real time locations of additional UAVs in the show airspace, and the ground-based show control system may then modify operations of the one or more show effect devices automatically to adjust illumination or projection to control illumination of one or more of the UAVs located between the UAV and the one or more show effect devices physically separated from the UAV.

In some implementations of the system, the triggering signals are generated at a point in time that is early or later than the timing defined in the timeline for the distributed aerial show. The one or more show effect devices physically on or supported by the UAV may provide light, video, or laser projection from the UAV to the one or more show effect devices physically separated from the UAV. In these or other cases, the one or more show effect devices physically separated from the UAV provides light, audio, video, or laser projection on or toward the one or more show effect devices physically on or supported by the UAV. The one or more show effect devices physically separated from the UAV may be configured to provide light, video, or laser projection onto the UAV or the one or more show effect devices physically on or supported by the UAV.

To enhance safe system operations, the ground-based show control system may be configured to only generate the triggering signals when the UAV is determined to be in a safe position for operations of the one or more show effect devices physically separated from the UAV, such as pyrotechnics or fire effects. The ground-based show control system may operate the one or more show effect devices physically separated from the UAV to highlight the UAV in the show airspace during an emergency landing of the UAV. The ground-based show control system may also operate the one or more show effect devices physically separated from the UAV to highlight an additional UAV in the show airspace during the timeline of the distributed aerial show.

DETAILED DESCRIPTION

Briefly, an aerial show system is described that includes one-to-many unmanned aerial vehicles (UAVs) each with an onboard show assembly with one or more show effect elements. The aerial show system also includes one-to-many distributed ground-based show systems each with a show effect element(s). The aerial show system is configured to track the UAVs during a show performance so as to coordinate and/or synchronize their operations with those of the ground-based show systems (which are typically spaced apart some distance from the UAVs) to enable the dynamic show participation of the UAVs and their show effect elements with the distributed ground-based show systems and their show effect elements to achieve a highly choreographed show. In some embodiments, one or more of the ground-based show systems provide output or effects that interact or combine with output or effects of one or more of the onboard show systems of the UAVs to achieve a complete show effect or a cumulative effect, which requires careful synchronization of the onboard and distributed show systems when the UAVs are hitting their marks/cues defined in a show flight plan as well as when the UAVs are off course or off schedule in the show airspace.

The new aerial show system is particularly well-suited for providing a show or display in the sky or space above a group of viewers or observers below (e.g., on the ground). The aerial vehicle or aircraft may take the form of nearly any UAV such as a tricopter, a quadcopter, or other similar device configured for lifting and/or carrying heavier loads while other embodiments may use UAVs in the form of blimps, planes, and/or ballistic objects (such as a launched or dropped animatronic or robot) such that "UAV" is intended to be construed in a very broad sense. The show system or assembly with its one or more show effect elements is "onboard" in the sense that it may be physically on or in the body or structural frame of the UAV or it may be tethered to or otherwise coupled with the UAV to be hung below the UAV or drone. The UAV, in this way, is configured to support or carry a portion of an overall show system, and an onboard or local show controller is provided on the UAV to control operations of the components of the onboard show system/assembly. The control may be performed by generating show control signals for the components of the onboard show system to suit a predefined show stored in local memory in a dynamic fashion based on output of a UAV controller (e.g., providing data on UAV speed, present location, and the like). Further, synchronization with other show systems may be provided through communications with a ground-based show control system that tracks the location and operations of each UAV in the show airspace (e.g., with a tracking device or system) and that runs or provides a central or main show controller to provide timing and trigger signals to each show system on each UAV as well as distributed ground-based show systems.

Figure 1:
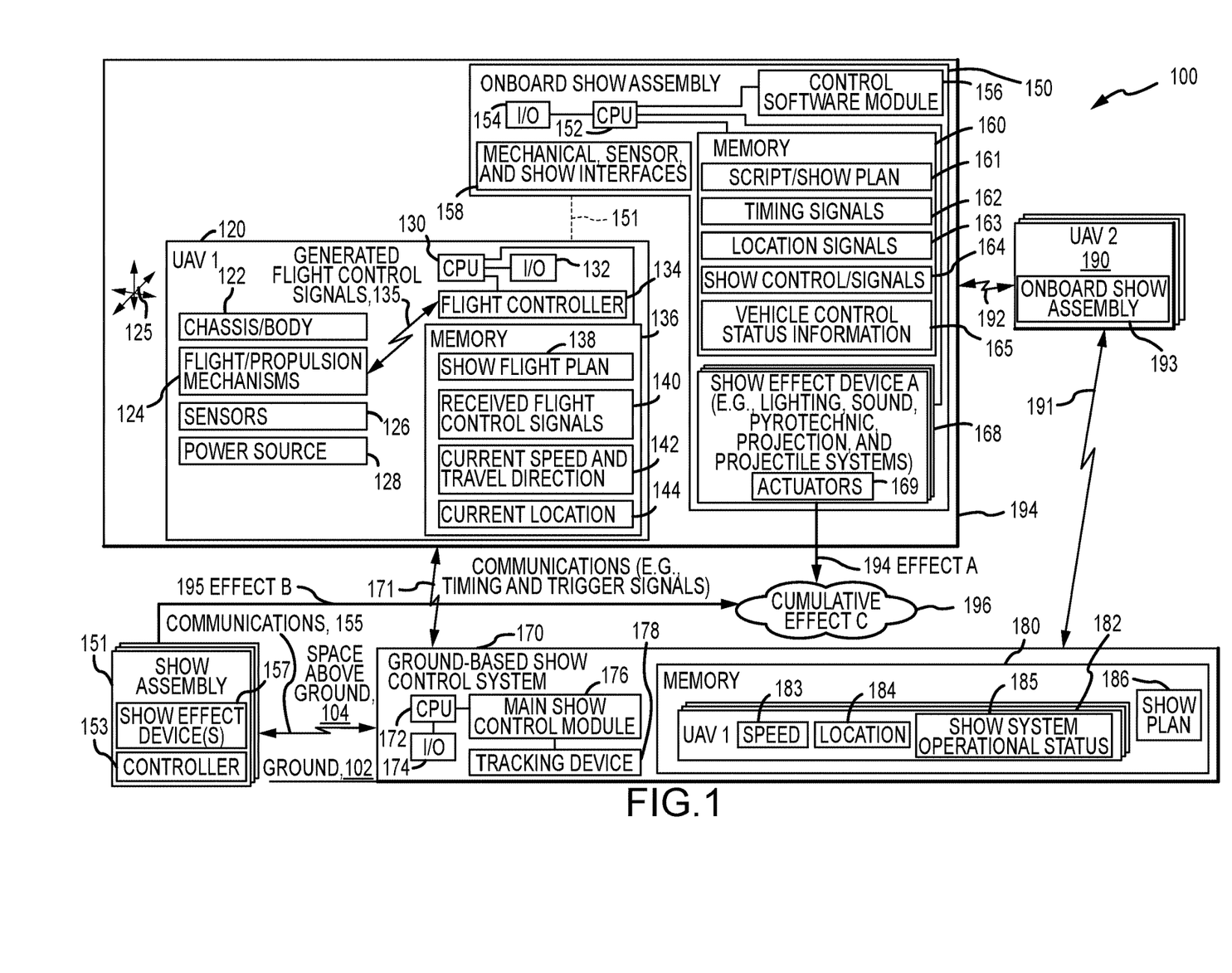
FIG. 1 illustrates a functional block diagram of an aerial show system using unmanned aerial vehicles (UAVs) dynamically with other distributed show effect elements according to the present description.

FIG. 1 illustrates a functional block diagram of an aerial show or display system 100 that makes use of the new control methods of the present description. The system 100 includes a UAV (or drone) 120 that physically supports as shown with dashed line 151 an onboard show system or assembly 150 to provide one or more flying show elements via show effect devices 168, such as a flying projection screen, a flying lighting system, a flying projectile launcher, and so on. Stated differently, the UAV 120 is configured to support the show assembly 150 and to move it about in a space 104 above the ground 102, such as in three dimensions or in any direction as shown with arrows 125, where it or the effects created by the show assembly 150 can be viewed by audience members (not shown but understood) on the ground 102. The show assembly 150 or its show effect devices 168 may be supported via couplings (shown with dashed lines) with the UAV chassis/body 122.

The UAV (or UAVs) 120 may take many forms to carry and position the onboard show assembly 150. In general, the UAV 120 may be any unmanned aerial vehicle or object including vehicles movable or propellable through the space 104, via propulsion mechanisms 124, such as ballistic objects and such as vehicles using propellers such as plane-type drones, such as blimps/balloons, and such as helicopter-type drones using one or more propellers such as tricopters, quadcopters, and aerial vehicles with five, six, or more propellers, and propulsion for 3D movement 125 of the chassis/body 122 (and supported show effect device 168) is provided by flight propulsion mechanisms (e.g., motor and propeller combinations) 124. The UAV 120 often will be chosen for its ability to support its own weight while also supporting the weight (and drag during flight) of the onboard show assembly 150. The UAV 120 further includes a power source 128 (such as a battery or batteries) to power operations of the mechanisms 124 and other power-requiring components of the UAV 120. Sensors 126 are provided to sense operations of the UAV 120 including the propulsion mechanisms 124 and for determining operating parameters such as roll, pitch, and yaw of chassis/body 122, speed (and direction in some cases) of chassis/body 122, and location/position of the chassis/body 122 in the space 104.

The UAV 120 also includes a processor(s) 130 that manages communications (typically wireless) with a ground-based show control system 170 as shown with arrows 171 and with other UAVs 190 (with their own show effect assemblies 193) of the system 100 as shown with arrows 192. Input/output (I/O) devices 132 are provided for this purpose and may include wireless transceivers and the like as is well known in the UAV industry. The UAV 120 includes memory/data storage 136 that is managed by the processor 130, and a flight controller 134 (e.g., hardware and software) also managed (or code executed) by the processor 130. The flight controller 134 processes and executes a flight plan 138 stored in memory for a particular show/display performed during operation of the system 100, and, in response, the flight controller 134 may generate flight control signals 135 that are provided or communicated to the flight propulsion mechanisms 124 to cause these to operate to move 125 the UAV 110 from one location to the next along the flight path at a desired speed as shown with arrows 125. The signals 135 may also be generated based on output from the sensors 126 such as based on current speed and travel direction 142 and/or current position/location 144 in the space 104 relative to desired show marks/positions and timing defined in the show flight plan 138. Further or alternatively, the signals 135 may be generated by the flight controller 134 based on received flight control signals 140 from the ground-based show control system 170 as shown with communications 171 and/or based on input from the onboard show assembly 150 and its control software module/show controller 156.

The show assembly 150 may include mechanical, sensor, and/or show interfaces 158 to allow the onboard show assembly 150 (or its show controller 156) to communicatively interface with the propulsion mechanisms 124, the sensors 126, and/or the flight controller 134. As can understood from this discussion and FIG. 1, the system 100 includes the UAV 120 with a chassis 122 housing or supporting flight propulsion mechanisms 124 capable of lift and/or movement in three dimensions as shown with arrows 125. The flight controller 134 is provided on the UAV 120 to generate and/or receive flight control signals 135 and 140, and the controller 134 is coupled to the flight propulsion mechanisms 124. The mechanisms 124 and/or sensor 126 operate to indicate an absolute or relative position 144 in the space 104, and the flight controller 134 causes the flight propulsion mechanisms 124 to move 125 the UAV chassis 122 to locations indicated by the flight control signals 135 (and signals 140), with the locations often being defined in the show flight plan 138.

The entertainment platform 110 includes an onboard show assembly 150 that is supported by the UAV 120 to move 125 with the UAV 120. The show assembly 150 includes a processor 152 managing operations of I/O devices 154 to facilitate communications with offboard devices such as communications 171 with the ground-based show control system 170 and such as communications 192 between other UAVs 190 in the space 104 (e.g., other UAVs with show assemblies 193 to provide a show via coordinated operations with the show effect device(s) 168 and distributed show assemblies 151 and their show effect devices 157). The processor 152 also executes code/instructions or runs software in local memory 160 to provide the functionality of an onboard show controller or control software module 156.

Particularly, the onboard show controller 156 acts to process a script(s) or show plan 161 to generate a set of show control signals 164, which are communicated to one or more show effect devices 168 to cause their actuators 169 to operate to create a particular show effect. The assembly 150 includes interfaces 158 to the mechanisms 124, to the sensors 126, and/or the flight controller 134 to allow it to receive vehicle control status information 165 (e.g., flight speed, chassis orientation (yaw, pitch, and roll), and the like), current speed and travel direction 142, and current location 144 for the UAV 120. The show controller 156 may generate, from the script/show plan 161 or receive from the flight controller 134 or ground-based show control system 170 to achieve dynamic participation, timing/trigger signals 162 and location signals 163, which may be used independently or in combination to create the show control signals 164.

The show plan 161 may include two or more scripts (or branches to new show segments) that may be chosen dynamically by the show controller 156 based on the timing signals 162, the location signals 163, and/or the vehicle control status information 165. In this manner, the show effect devices 168 may be operated to provide a desired show effect at predefined or dynamically selected timing and/or locations in the space 104 of the UAV 110. In some preferred embodiments, the dynamic selection is achieved based on communications 171 from the ground-based show control system 170 that coordinates operations of the onboard show assembly 150 with that of distributed show assemblies 151 with ground-based show effect devices 157. The show controller 156 or main show control module 176 can also generate the alternative scripts for one or more of the show effect devices 168, 157, and 193 in real time. The predefined scripts/branches of the show or real time-generated scripts/branches of the show (e.g., to alternative in real time) may be selected or created by the show controller 156 or, more typically, by the main show controller 176 based on real time data such as the current location 144 of the UAV, the current speed and travel direction 142, and/or the current orientation of the UAV chassis 122 (and, therefore, of the show effect devices 168) as may be provided in the vehicle control status information 165 from sensors 126. In some cases, the real time data used to choose a "B," "C," or other show script or branch in a show plan 161 may include a location of nearby UAV 190 in the space 104 to improve the quality of performance of the show plan 161 (or show plan 186).

All or a subset of the show effect devices 168 may be provided on the UAV chassis 122 or may be tethered or otherwise coupled to the chassis 122 such as to hang below or behind the UAV 120 during flight. The show effect devices 168 each includes one or more actuators 169 that are responsive to receipt of the show control signals 164 to operate the corresponding show effect device 168 to operate in one or more predefined manners (e.g., to illuminate in a particular brightness range and/or color, to play a soundtrack at a particular volume, to project a video or still image, to eject a particular projectile or set of projectiles, and so on). The show effect devices 169 may take a wide variety of forms to implement the entertainment platform 110 such as a lighting system (e.g., one-to-many white or colored LEDs, lasers, blacklights, and so on), a sound system with a playback device and one or more speakers, a pyrotechnic system for creating one or more pyrotechnic effects, and/or a projectile system (e.g., for releasing or ejecting projectiles such as confetti, streamers, water droplets or streams, coupons, souvenirs, and other objects).

In some implementations, the onboard show assembly 150 is implemented in a distributed fashion with some components (such as show effect devices 168, such as processor 152, memory 160, and controller 156 and the show effect devices 168, and any other combination) on or in the UAV chassis/body 122 and some in components tethered or coupled to the chassis/body 122 but spaced some distance apart (e.g., a screen or object hung below the UAV chassis 122). The onboard show system or assembly 150 includes computational resources such as processor(s) 152 and controller 156 that communicate with each other such as through the interfaces 158. The onboard show controller 156 with processor 152 (and with memory 160 in some cases) may be located wholly in or on the chassis/body 122 or on/in a show effect device 168 or a structural component (not shown) of the assembly 150, and it may receive power from the power source 128 and data from the flight controller 134 (or directly from propulsion mechanisms 124 and/or sensors 126) from the host UAV chassis 122 via the interfaces 158 (e.g., through a show interface). The onboard show controller 156 may be connected to various onboard show effect devices 168 in order to directly control and sequence their operation.

In some embodiments of the system 100, the onboard show controller 156 receives timing and trigger signals 171 from a ground-based show control system 170. To this end, the ground-based show control system 170 includes I/O devices 174 for communicating with I/O devices 154 of the onboard show assembly 150. The I/O devices 174 may be managed by a processor 172, which also executes code and/or runs software to provide functions of a main/central show control module or show controller 176. The show control system 170 further includes memory/data storage 180 storing for each UAV 120, 190 in a show system fleet a record or file 182 that stores data particular to that UAV 120 or 190 such as its current speed 183 and location/position 184 in the space as well as other operating data 185 (e.g., orientation, operating status of its show effect devices 168, and so on). The memory 180 may also store a show plan 186 defining flight paths and show scripts for each show system/assembly 150, 193 for each UAV 120, 190. To this end, the ground-based control system 170 further is shown to include a tracking device 178 that operates to track or determine the current location 184 and speed 183 of each UAV 150 and 190 in the airspace 104 during a show performance. Such tracking may be performed in part by processing communications 171, 191 from the UAVs 120, 190 and/or through the use of software and/or hardware provided with the tracking device 178 (as is well known in the UAV/drone industry and not explained in further detail herein).

The system 100 further includes one-to-many distributed show assemblies 151, which are often ground-based or are on or supported by the ground 102, and these assemblies 151 are spaced apart from each other and the show effect devices 168 in the airspace 104 during a show performance so as to provide distributed show effects. Each assembly 151 includes a controller 153 operable to communicate as shown with arrows 155 with the ground-based show control system 170 to receive timing and trigger signals. In response, the controller 153 is able to operate one or more of the show effect devices 157 (e.g., based on a triggered script or a single or set of control signals to provide a show effect (e.g., to trigger a sequence of laser lights, to project images into the space 104, to operate a spotlight to provide light in the space 104, to launch a projectile(s), and so on).

In many show designs, a show effect device 168 (or in assembly 193) will operate to provide an output or produce a first show effect 194 in a time and location (and, sometimes, orientation) synchronized manner (sequentially one or the other before the other or concurrently together at a particular time along the show timeline) with operation of one or more of the ground-based show effect devices 157 to provide a second show effect 195, which when combined produce a third show effect or a cumulative effect 196 in the airspace 104. For example, the show effect device 168 may operate to unfurl or present a screen or surface while the show effect device 157 may provide a projector or a lighting device to project images or light upon the screen or surface. In another example, the show effect device may launch a projectile or fireworks into the space 104 concurrently with or sequentially before or after the show effect device 157 provides a synchronized firework or pyrotechnic show effect. The synchronization of the two effects 194 and 195 allows their interaction to create a new cumulative effect 196, which is only of high quality due to the operations of the ground-based show control system 170 to provide dynamic interaction of the show assembly 150 onboard the UAV 120 with the distributed show effect device(s) 157.

During operations of the system 100, the onboard show controller 156 may receive timing and trigger signals 171 (and as shown stored in onboard memory 162) from the ground-based show control system 170, e.g., based on processing of output of the tracking device 178 along with the show plan 186. The system 170 operates independently of the safety-critical flight controller 134 of the UAV 120 but in coordination with the real-time location 144 (and signals 163) of the UAV chassis 122. The geographic location 144 (and location signals 163) can be used to actuate show effects by operation of the show effect devices 168 with control signals 164 based on pre-programmed conditions (e.g., entering and/or exiting a specific geographic area at a particular time to hit a mark/cue in a show) in order to synchronize with the UAV's flight path in real time. In some cases, the onboard show controller 156 may use vehicle control status information 165 to enhance the safe operation and recover of the platform 110. This may involve the controller 156 using the location of nearby participating UAVs 190 to inhibit show actions (e.g., operations of show effect devices 168) that may pose a hazard (e.g., not activating onboard pyrotechnic effects if too close to another UAV or platform 190).

Figure 2:
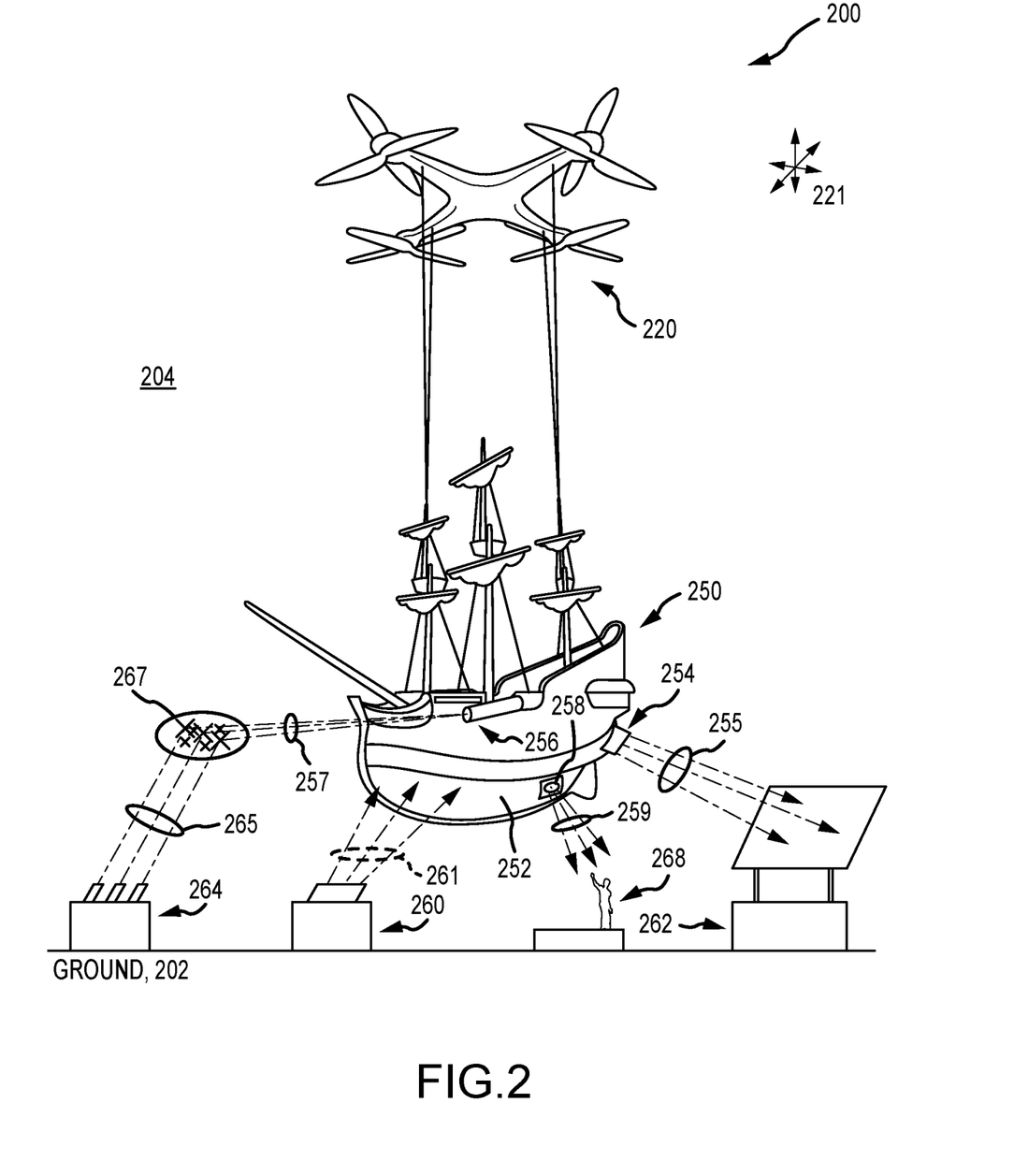
FIG. 2 is a side perspective view of one exemplary implementation of an aerial display or show system during its use of UAVs with onboard show systems and distributed show systems in a show or display.

FIG. 2 is a side perspective view of one exemplary implementation of an aerial display or show system 200 during its use of UAVs with onboard show systems and distributed show systems in a show or display. Particularly, a single UAV 220 for simplicity sake with it being understood from FIG. 1 and the prior discussion that additional UAVs with the same or differing propulsion mechanisms and/or same or differing show assemblies/payloads would often be included in the system 200. The UAV 220 is operated to move, with its propulsion mechanisms that includes four rotors/propellers as shown, in three dimensions as shown with arrows 221 in an airspace 204. The UAV 220 has an onboard flight controller that operates the propulsion mechanisms to attempt to follow a pre-programmed flight plan, with updates and changes based on conditions and based on additional control signals from a ground-based control system (not shown but understood from FIG. 1). The ground-based control system also communicates with the UAV 220 and/or uses a tracking device to determine and track the 3D position of the UAV 220 in the airspace 204 during the show and to determine when the UAV 220 is hitting its mark/cues and, if not, to modify the operations of its onboard show system and/or ground-based show systems to provide dynamic interaction between these show components.

In this regard, the system 200 includes an onboard show system or assembly 250 that is tethered to (or supported underneath) the structural frame/body of the UAV 220 to be moved about 221 the airspace 204 with the UAV 220. In this example, the show assembly 250 provides a set of show effect devices or elements. These include a projection screen/display surface(s) 252, which in this example is shaped as a sailing ship, and a show assembly 260 on the ground 202 may be operated to project images or output light 261 onto the screen/surface 252 when the UAV 220 positions it in a particular location with a desired orientation at a preset time (or time selected by the ground-based control system) so these two show elements interact to achieve a desired cumulative show effect.

Further, the system 200 includes a ground-based show assembly 262 in the form of a projection screen/display object or surface(s) 262, and the onboard show assembly 250 includes a projector/light element (e.g., spotlight) 254 that is triggered to project or output images/light 255 onto the screen/surface of the ground show assembly 262 when the UAV 220 moves the show assembly 250 into a 3D position in the space 204 at a predefined (or later defined by the main show controller) of a show's timeline (e.g., the show element 262 and the show element 254 interact to form a cumulative optical or show effect). Still further, the system 200 includes a ground-based show effect element 264 that is triggered in a synchronous manner by the ground-based control system to output fireworks or pyrotechnics 265 with an onboard show effect element 256 that also outputs fireworks or pyrotechnics 257 so that these interact or intersect in a portion of the airspace 204 to create a cumulative or new show effect 267. Also, an actor (human or robotic) 268 performs a show element, and the ground-based show controller triggers operation of a show effect device 258 in the show assembly 250 when the UAV 220 is in a particular 3D location at a time chosen to be synchronized with performance by the actor 268 to provide its performance or show element. For example, the device 258 may be a lighting system (which may include a white or colored spotlight(s)) to provide light 259 that is targeted onto the stage or space in which the actor 268 is performing.

As can be seen from FIGS. 1 and 2, an aerial show system may be usefully configured to provide dynamic participation of a UAV/aircraft and the show effect devices it carries with distributed show effect devices to provide a choreographed aerial show or display. The distributed show effect devices may be on or supported by other UAVs in the airspace and/or on the ground below or nearby the airspace. The UAV/aircraft has flight propulsion mechanisms capable of lifting and moving the UAV chassis in three dimensions in the airspace. The aerial show system includes ground-based and onboard show control systems for generating and/or receiving timing signals and location signals, and these show control systems also include computational resources configured to execute a script, which is operable to generate show control signals based on the timing signals and the location signals.

The aerial show system includes a first set of one or more show effect devices (e.g., light elements, audio devices, projectors, fog-making machines, pyrotechnic assemblies, and the like) that are physically couple to the aircraft/UAV. Each is designed to be capable of triggering in response to receipt of a show control signal. The aerial show system further includes a second set of one or more show effect device physically separated from the UAV/aircraft that are on the ground or in another aircraft/UAV, and each of these are also designed to be capable of triggering in response to receipt of a show control signal. During operations of the aerial show system, at least one of the aircraft-based or onboard show effect devices interacts with at least one of the off-aircraft show effect devices to produce a complete or cumulative show effect. The device interaction may involve light, video, and/or laser projection from the aircraft-based show effect device to the off-aircraft show effect device (or vice versa). The device interaction may involve a projectile traveling between the aircraft-based show effect device to the off-aircraft show effect device (or vice versa).

Figure 3:
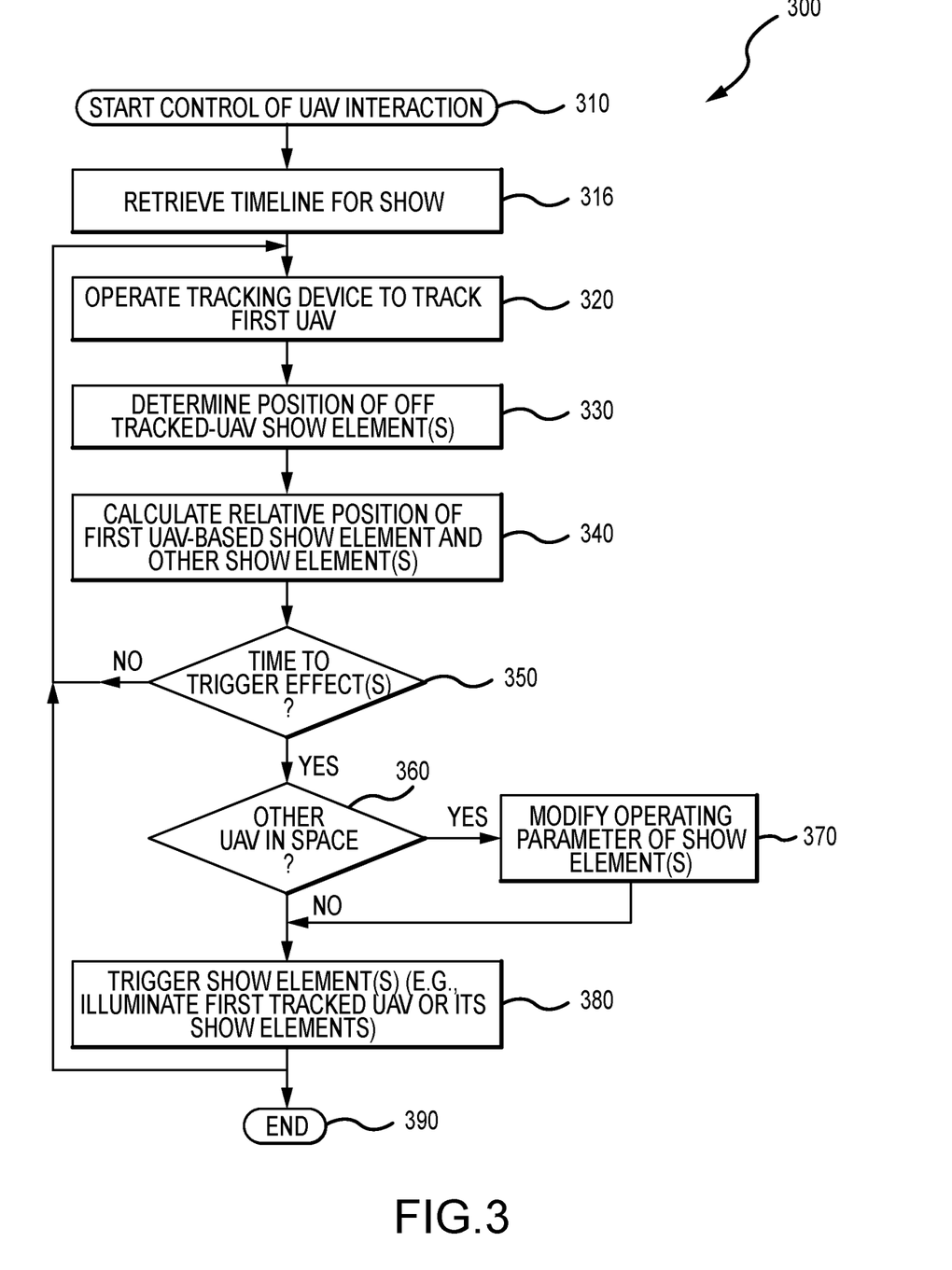
FIG. 3 is a flow diagram of a control method for operating a show system to provide dynamic interaction of a UAV with off-UAV show elements.

FIG. 3 illustrates a control method 300 for a show system to provide an aerial show with dynamic interaction of a tracked UAV and other off-UAV show components. The method 300 starts at 310 such as with providing a ground-based show control system (e.g., the system 170 of FIG. 1) and defining a show plan with a timeline providing timing of a plurality of show effects and how such show effects are to be achieved. As discussed above, some of the effects are achieved by interaction between a UAV and/or its onboard show system (with its show effect elements/devices) and show effect devices that are distributed in or near a show space (offboard the tracked UAV) to achieve a complete or cumulative show effect. Step 310 also involves providing one or more UAVs with (or without) onboard show systems and distributed show systems designed to provide show effects for the show plan.

The method 300 continues at 316 with retrieving or accessing the timeline for the show defined by the show plan. In this way, the ground-based show control system is aware of timing of show effects and which show effect devices are intended to be operated to achieve these show effects and the required location for particular UAVs at these show effect times (e.g., the marks/cues for each UAV carrying out a show plan). The method 300 continues at 320 with the ground-based show control system operating a tracking device to track a first one of the show UAVs to determine its current operating parameters including speed, location, and orientation (and, in some cases, operating status of its show effect elements). The tracking device may also be operated at 330 to determine positions of show effect elements that are not on the first tracked UAV (e.g., off-board show effect elements). In some cases, these show elements will be provided in a fixed position on the ground, and the locations can simply be retrieved from memory/data storage accessible by the show control system. In other cases, these show elements may be movable during the show such as on the ground or in/by another UAV flying in the show's airspace such that the location of the other show effect elements may change over the show's timeline.

At 340, the method 300 continues with the control module (or tracking device) of the ground-based show control system operating to calculate the relative positions of the first tracked UAV and/or its show element(s) and the show elements tracked in step 330. Then, at 350, the show control system operates to determine, based on the retrieved show timeline, whether it is time to trigger a next show effect that involves the first tracked UAV. If not, the method 300 continues at 320 with tracking the first UAV in the show's airspace. If yes (or soon approaching this time), the method 300 continues at 360 with determining whether the other show element tracked in step 330 is a collaborating UAV. If so, the show control system operates, when needed, at 370 to modify operating parameters of the show elements of the first tracked UAV or of the collaborating/other UAV to achieve a desired show effect. Then, at 380, the show element(s) are triggered to provide the show effect defined at this time in the show's timeline. The method 300 may then end at 390 such as at the end of the show timeline or may continue at 320.

In exemplary implementations of the method 300, the tracking device's output (e.g., current and/or relative positions of the first tracked UAV and off-board show elements) is used to trigger the operation of an offboard show effect device that includes a lighting system (e.g., a spotlight(s)) and/or a projector(s) to illuminate or project upon (e.g., transmit light toward) the UAV or one or more of its show effect elements (e.g., a projection screen, a surface of the UAV body/chassis, cladding used to cover the UAV body/chassis, and the like). This can be considered achieving a cumulative show effect. In some useful applications, the offboard show effect device is operated over a period of time to continue to illuminate or project upon the UAV or its show element device(s) as its relative position to the offboard show effect element (which is being tracked in real time by the tracking device) changes (e.g., by operation of the UAV's propulsion mechanism). This may involve moving a spotlight or project on the ground to follow the movements of the UAV in the show's airspace. In other embodiments, the lighting system or projector is provided on the first tracked UAV, and it is operated to be aimed at or to target the ground based or UAV-based offboard show effect element (e.g., a projector on the first tracked UAV is rotated/pivoted to project images onto a projection screen or surface on a nearby UAV or upon a ground location such as onto a stage where a human or robotic actor is performing).

As noted in step 370, the real time location of a collaborating UAV and/or its show effect devices may be used by the show control system to automatically adjust the tracking illumination (e.g., illumination provided by a ground-based show effect device or provided by a device onboard the first tracked UAV). For example, the lighting system or projector may be adjusted, at least temporarily, to minimize an unintended reveal of another UAV as it briefly transits between the offboard show effect device and the first tracked UAV or its show effect device (or between a light source and an intended target object/surface). Such adjustment may be to reduce brightness (or change its color) or even halt the illumination stream until the other UAV will no longer be illuminated by the illumination stream.

Figure 4:
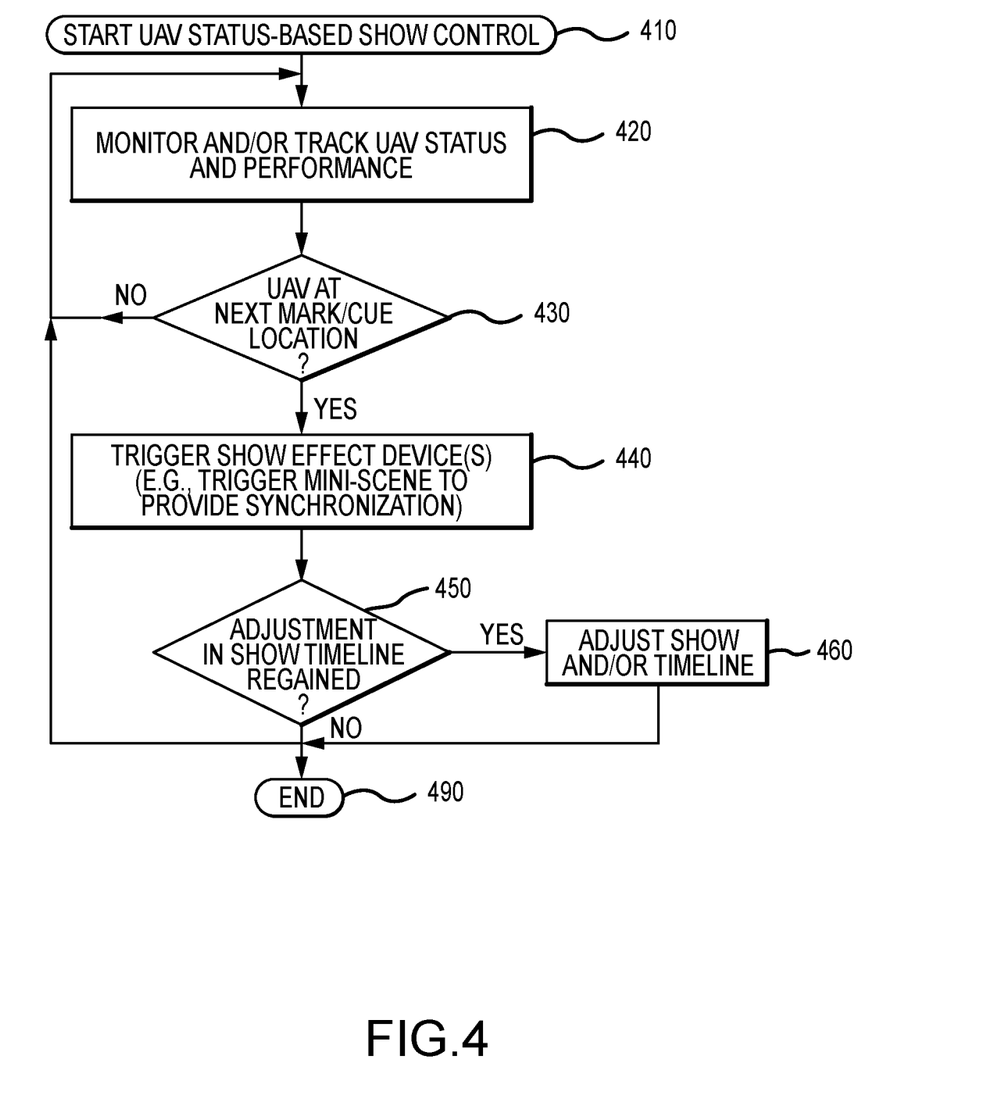
FIG. 4 is a flow diagram of a show control method that provides UAV status-based control over show effect devices.

In some preferred embodiments, show effects outside of the aircraft may be adjusted by the main show control system due to real-time vehicle status and performance. FIG. 4 shows such a control method 400 that starts at 410 such as with providing a main show control system with a UAV tracking device and/or UAV communications hardware, and step 410 may also include the main show control system retrieving and initiating a show plan that defines a show timeline and show effects to be generated at particular times along the show timeline. The method 400 continues at 420 with the main show control system operating to monitor and/or track the status and performance of a UAV that is participating in a show's performance. This may involve tracking the speed, direction, orientation, and location of the UAV in a show's airspace as well as other operating parameters such as current status of each of its show effect devices (e.g., is a projection screen or object unfurled and in what orientation, is a projectile launching mechanism operable in a ready to launch mode, and so on).

The method 400 continues at 430 with the controller operating to compare the current location of the UAV with a next of its mark/cue locations in the show's timeline to determine if the UAV's position (e.g., current operating status) is at or near this location. If not, monitoring and/or tracking of the UAV is continued at 420. If yes, the controller operates at 440 to trigger the show effect device(s) whose operations are associated with providing a show effect(s) when the UAV reaches this particular location in the show airspace. This may involve triggering a ground-based show effect element, triggering a show effect element onboard the UAV, triggering a show effect device on a collaboration UAV, and/or cuing performance by a human or robotic actor so as to achieve a desired show effect (which may be a cumulative show effect provided by UAV interaction with an offboard show effect device). The method 400 then continues with determining at 450 whether the UAV hit the mark/cue in a timely manner or not. If not, an adjustment to the show timeline or show content may be provide at 460 by the show control system such as when a show effect was generated/performed at an earlier or later time or not at all due to a UAV's status (off course too far to perform effect, show effect devices being inoperable, and so on). The method 400 may then end at 490 such as at the end of a show's timeline or may continue with repeating step 420.

As can be appreciated from this discussion of FIG. 4, show effects outside the UAV may be adjusted based on the real time status and performance of the UAV. Particularly, triggering of show effect devices' operations may be done based on actual UAV position and/or velocity instead of only on a pre-programmed timeline. This allows the main show control system to account for variability in UAV performance, which may vary from show-to-show dues to factors such as wind in the airspace and hardware characteristics and variability for the UAV.

Scenes of a show (and show effects for such scenes) may be triggered by the main show control system early or later than ideally intended (or set in the show timeline) based on actual UAV location compared to expected programming (e.g., a UAV show flight plan). Musical scores, lighting cues, and the like may be bundled into mini-scenes to be triggered and, when useful, mixed based on actual UAV position in order to maintain overall show synchronization. The result will be more cohesive compared to one long show timeline that starts executing when the UAV begins its show flight plan/profile, proceeding regardless of the true location of the UAV which may be slightly off course due to performance irregularities. This content may be authored such that it can be gracefully mixed to the following scene in the show's timeline and may be stylistically able to end early or late in the tracks.

Figure 5:
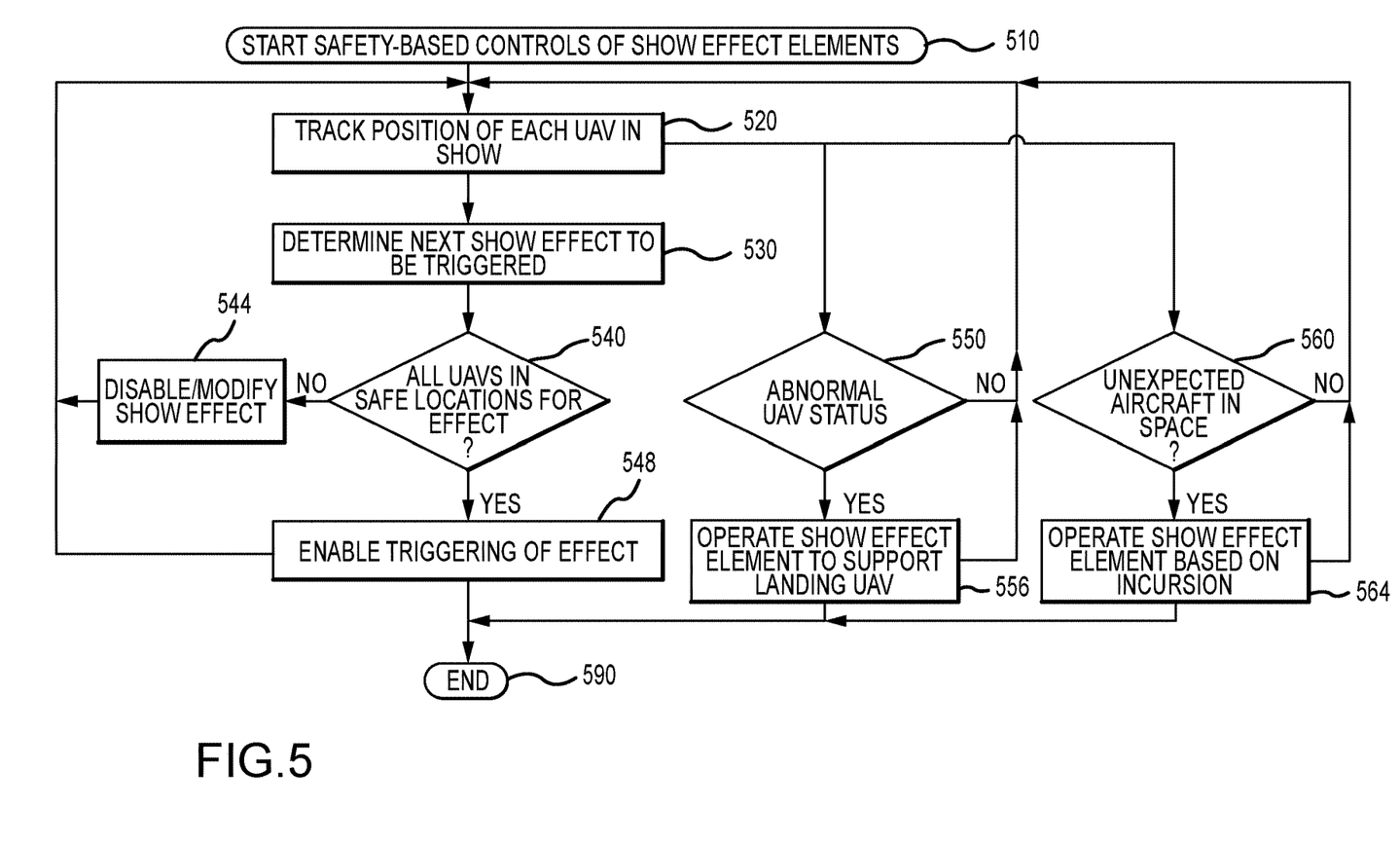
FIG. 5 is a flow diagram of a show system control method for safety-based control of show effect elements based on tracked locations of UAVs in a show's airspace.

FIG. 5 is a flow diagram of a show system control method 500 for safety-based control of show effect elements based on tracked locations of UAVs in a show's airspace. During operation of an aerial show or display system, such as system 100 of FIG. 1, UAV status and/or tracking information can be effectively leveraged to enhance safety of system operations during a show performance. The method 500 may start at 510 such as with defining a set of safety requirements for performance of a show that may include safety requirements for operating/triggering operations of one or more show effect devices such as pyrotechnic devices, laser devices, and the like. The safety requirements may also include operating steps for a show system or its components upon occurrence of particular events such as upon emergency conditions for a UAV, incursion of a non-show aircraft into the airspace, and so on.

At 520, the method 500 involves a tracking device or other component of a main show control system operating to track a position of every UAV in a show's airspace. At 530, the method 500 involves determining a next show effect to be triggered in a show's timeline or show plan, which is presently being used to perform a show or display in the show's airspace. At 540, the method 500 involves the main show control system operating to determine whether, based on the tracked locations of UAVs from 520, all UAVs in the airspace are at locations deemed to be safe for performing the next show effect (e.g., launching a projectile, initiating pyrotechnics, and other show effect device operations). If not, at 544, the show effect may be disabled or skipped in the show timeline or modified to allow its safe performance (e.g., modify a trajectory of a projectile, modify amount or type of pyrotechnics, and so on). If all UAVs in safe positions, the show effect devices associated with the next show effect are triggered at 548, and the method 500 continues at 520. In this manner, the global show control system can use the tracking system/device to ensure a potentially hazardous show effect such as pyrotechnics or lasers do not activate when the UAV is in an unsafe position (such as near the audience or another UAV).

Concurrently with steps 530-548, the method 500 includes at 550 monitoring the UAVs in the show system to determine if any are reporting (or otherwise determined to be having) abnormal operating conditions that require it to perform an emergency landing during a show performance. If not, the method 500 continues at 520. If yes, the method 500 continues at 556 with operating one or more show effect devices to support landing the UAV experiencing the emergency operating condition. For example, the show control system may operate lighting apparatus (e.g., spotlights) to their maximum brightness and to illuminate (and track/follow movements in real time in some cases) the UAV as it undergoes an emergency landing so as to enhance safety of the show crew and audience during its landing.

Also, concurrently with steps 530-548, the method 500 includes at 560 monitoring the show airspace for any non-show aircraft. If none detected, the method 500 continues at 520. If an unexpected UAV or other aircraft is detected at 560, the method 500 includes at 564 operating one or more show effect devices in a manner suited to this detected incursion. The method 500 may end at 590 such as at the end of a show timeline. Step 564 may involve operating, for example, offboard lighting (e.g., spotlights) to illuminate the unexpected or intruding aircraft and to track its real time movements in the airspace over time and/or to illuminate show UAVs and their show effect devices that may be in the path of this intruding aircraft to lessen risk of collisions with show system components.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, there are applications where the UAV will take the form of an airborne robotic device that may not include its own propulsion mechanism but, instead, may be dropped from a height or launched into the show airspace. It may be useful to track the performance of such airborne robotic devices in their travel through a show's airspace with regard to their travel timing, their performance of particular functions (e.g., did onboard show effect devices such as robotic mechanisms perform as expected at a particular time in a show timeline), and/or their location, orientation, and so on, and this tracked information could be used to trigger (in a synchronized manner as discussed above) onboard and/or offboard show effect devices to achieve a desired show effect (standalone or cumulative effect).

Untethered airborne robotic devices are subject to a larger performance variation than traditionally powered animatronics. As such, it is difficult to rely on mere synchronization of initiation of preprogrammed behaviors to ensure ground-based effects (or other offboard show effects) such as sound, ground pyrotechnics, and the like will occur at the right time and with the right setting/modulation based on actual airborne robotic device performance.

For example, if wind were to delay an airborne robotic device by even a fraction of a second, a ground-based pyrotechnic show effect device may fire moments before the airborne robotic device reached the proper configuration and location in the sky (e.g., a hands-out pose to correspond with a flying superhero or the like). In another example, the location may be correct at the right time but the orientation may differ from a planned show effect ("Show Effect A") so that it would seem improper to simply follow the original show timeline and planned show effect device operation (e.g., Show Effect A may be an audio soundtrack playback from a ground-based show effect device but with the actual orientation and/or pose achieved it may be desirable to use "Show Effect B", which may be preprogrammed and selected by the show control system or may be generated in real-time or dynamically in response to the actual UAV orientation, pose, location, timing, or other parameters. Another example might be ground-based projection or lighting effects that need to strike the flying animatronic figure precisely even though is precise location at any given time during a show may vary. The inventors recognized that what is needed is a way of triggering ground-based effects from the untethered airborne robotic device based on its actual progress or pose and/or from the ground-based control system based on tracked real-time operations of the airborne robotic device.

There are a number of techniques that may be used in a show system to trigger off-board effects when the UAV is ballistically launched object in the form of an airborne robotic device (or, in some cases, when the UAV is a quadcopter (or other copter), drone, or the like with an onboard propulsion mechanism). As a first example, the untethered airborne robotic device may be instrumented with one or more sensors, such as position sensors, an inertial measurement unit (IMU), altitude sensors, pose sensors, and the like, that measure various state variables. For example, a ground-based or off-board show effect device may be scheduled in a show plan to be operate when a ballistic airborne robotic device is at its apogee and/or when it strikes a particular pose, but the ground-based show control system may instead of simply playing the show plan and hoping for synchronization generate the triggering signal to suit measured or sensed state variables.

In one specific case, a ballistic airborne robotic device is at its apogee of a thrust or launch event when an accelerometer measures zero g, and a show plan may call for show effect device in the form of a lighting system (e.g., a spot light(s)) to operate to illuminate the airborne robotic device at the apogee or when it appears to be hovering. The onboard sensor (e.g., sensor 126 in FIG. 1) may operate to sense zero g, and the onboard communication devices (e.g., onboard radio technology) may be operated by onboard controllers to transmit the information to the ground-based show control system (e.g., system 170 of FIG. 1), and this control system responds by generating a trigger signal(s) to cause the appropriate show effect devices to operate in a synchronized manner with actual performance of the airborne robotic device. In some cases, the trigger or control signals will also be generated to suit the orientation of the flying airborne robotic device such as to choose the correct lighting system to illuminate the front (or other) side of the airborne robotic device based on a pose or orientation sensed/determined by onboard sensors (e.g., operate show assemblies in real-time to provide a Show Effect B or cumulative effect with operation of the airborne robotic device and its onboard show effect devices).

In some embodiments, the communications components onboard the airborne robotic device may be operated with the airborne robotic device's control software module or the like to generate and transmit trigger or control signals to the appropriate offboard special effect device to achieve a desired show effect or cumulative show effect. Alternatively or in addition, the airborne robotic device may operate its onboard sensors to sense proximity to objects or another UAV (e.g., another airborne robotic device) and use this information to trigger onboard show effect device and/or ground-based (or offboard) show effect devices to perform a preprogrammed function or a function chosen specifically in response to the particular close proximity that is detected. For example, an in-air collision may be sensed that is processed to trigger a corresponding sound effect only when the two "colliding" (e.g., a near miss that appears to viewers to be a collision) UAVs are proximate.

Alternatively or in addition, ground-based tracking and visual monitoring may be used to determine when the airborne robotic device is in a correct position and pose and use that to trigger a ground event (a ground-based effect device operating in a preprogrammed or real-time programmed manner), and this solution may use very fast tracking technologies and/or motion predicting algorithms and techniques. When a pose and/or orientation are determined, the onboard or ground-based show control system may process this information to generate a control trigger/signal for a show effect device so that it operates in a way suited to that pose and/or orientation. For example, an acoustic module may process the pose and/or orientation of the airborne robotic device (e.g., which way is the flying robot facing at the time the effect is to be triggered?) and, in response, select the effect or modulate the effect to suit the pose and/or orientation. For example, an audio clip playback may be modulated (e.g., via a Doppler shift or the like) when the airborne robotic device is not facing the audience positioned below the show system's airspace to be more realistic (e.g., sound transmitted away from the audience when the airborne robotic device is facing away from the audience on the ground).

In the same or other embodiments, show effects are used to create a cumulative effect (combination of a ground-based show effect device and the flying or airborne robotic device or its launching devices) to disguise a portion of the operations of the show system. For example, a mechanical winch may be used to launch or fling a robotic device (e.g., to provide airborne robotic device or stunt robot), and an audio system on the UAV and/or in a ground-based show assembly may have its operations time synchronized with the mechanical winch to generate an output sound or sound clip that masks the audio noise of the mechanical winch.

We claim:

1. A system adapted for achieving dynamic participation in a distributed aerial show, comprising:
   a ground-based show control system generating triggering signals for triggering show effects based on a timeline defined for the distributed aerial show;
   an unmanned aerial vehicle (UAV) comprising an onboard or offboard flight propulsion mechanism operable to move the UAV in three dimensions in a show airspace;
   one or more show effect devices physically separated from the UAV and operable in response to the triggering signals to generate a first show effect; and
   one or more show effect devices physically on or supported by the UAV and operable in response to the triggering signals to generate a second show effect,
   wherein the first and second show effects interact to generate a cumulative show effect.

2. The system of claim 1, wherein the UAV further comprises an onboard show controller with computations resources executing a script to generate show control signals for the one or more show effect devices physically on or supported by the UAV based on the show control signals.

3. The system of claim 2, wherein the script comprises a mini-scene including a musical score or lighting cues triggered and mixed based on an actual location of the UAV in the show space to maintain synchronization of the distributed aerial show over the timeline and wherein the mini-scene is configured for ending early or late on the timeline to suit the actual location of the UAV.

4. The system of claim 1, wherein the ground-based show control system generates the triggering signals based on timing of the UAV traveling to or through a location in the airspace with respect to timing and a mark location defined in the timeline for the distributed aerial show.

5. The system of claim 1, further comprising a tracking device coupled to the ground-based show control system tracking a relative position of the UAV and the show effect devices physically separated from the UAV, wherein the relative position is used by the ground-based show control system to select a time for issuing the triggering signals.

6. The system of claim 5, wherein the relative position is used by the ground-based show control system to generate the triggering signals to cause the one or more show effect devices physically separated from the UAV to provide illumination or projections towards the UAV as the UAV is moved through the show airspace by the propulsion mechanism.

7. The system of claim 5, wherein the tracking device determines real time locations of additional UAVs in the show airspace and wherein the ground-based show control system modifies operations of the one or more show effect devices automatically to adjust illumination or projection to control illumination of one or more of the additional UAVs located between the UAV and the one or more show effect devices physically separated from the UAV.

8. The system of claim 1, wherein the triggering signals are generated at a point in time that is early or later than the timing defined in the timeline for the distributed aerial show.

9. The system of claim 1, wherein the one or more show effect devices physically on or supported by the UAV provides light, video, or laser projection from the UAV to the one or more show effect devices physically separated from the UAV or wherein the one or more show effect devices physically separated from the UAV provides light, video, or laser projection on or toward the one or more show effect devices physically on or supported by the UAV.

10. The system of claim 1, wherein the one or more show effect devices physically separated from the UAV launches a projectile toward the UAV or the one or more show effect devices physically on or supported by the UAV launches a projectile toward the one or more show effect device physically separated from the UAV.

11. The system of claim 1, wherein the ground-based show control system only generates the triggering signals when the UAV is determined to be in a safe position for operations of the one or more show effect devices physically separated from the UAV, wherein the ground-based show control system operates the one or more show effect devices physically separated from the UAV to highlight the UAV in the show airspace during an emergency landing of the UAV, or wherein the ground-based show control system operates the one or more show effect devices physically separated from the UAV to highlight an additional UAV in the show airspace during the timeline of the distributed aerial show.

12. A system adapted for achieving dynamic participation in a distributed aerial show, comprising:
a show control system generating show control signals;
an unmanned aerial vehicle (UAV) moving through a show airspace; and
one or more show effect devices physically separated from the UAV and operable in response to the show control signals,
wherein the show control system generates the show control signals based on a real time location of the UAV in the show airspace and on a show plan for the distributed aerial show defining locations for the UAV at predefined times along a show timeline.

13. The system of claim 12, further comprising a tracking device coupled to the show control system tracking the real time location of the UAV, wherein the show control system selects a time for communicating the show control signals based on the real time location to trigger operations of the one or more show effect devices, and wherein the time differs from the predefined times along the show timeline.

14. The system of claim 12, wherein the real time location is used by the show control system to generate the show control signals to cause the one or more show effect devices physically separated from the UAV to provide illumination or projections towards the UAV as the UAV moves through the show airspace.

15. The system of claim 12, wherein the show control system modifies operations of the one or more show effect devices automatically to adjust illumination or projection to control illumination of one or more additional UAVs located between the UAV and the one or more show effect devices physically separated from the UAV.

16. The system of claim 12, further comprising one or more show effect devices physically on or supported by the UAV operating in response to the show control signals to provide light, video, or laser projection from the UAV to the one or more show effect devices physically separated from the UAV or wherein the one or more show effect devices physically separated from the UAV provides light, video, or laser projection on or toward the one or more show effect devices physically on or supported by the UAV.

17. The system of claim 12, wherein the one or more show effect devices physically separated from the UAV launches a projectile toward or to intercept the UAV in response to the show control signals and based on the real time location of the UAV.

18. The system of claim 12, further comprising a sensor sensing a pose or an orientation of the UAV when at the real time location of the UAV and wherein the show control system triggers operation of the one or more show effect devices based on the pose or the orientation of the UAV.

19. The system of claim 18, wherein the show control system selects a file for playback by the one or more show effect devices based on the pose or the orientation of the UAV or modulates the operation of the one or more show effect devices to match the pose or the orientation.

20. The system of claim 18, wherein the one or more show effect devices comprises an audio system and wherein the show control system modulates an audio clip for playback by the audio system when the UAV is at the real time location based on the pose or the orientation of the UAV.

21. The system of claim 12, wherein a sensor on the UAV determines when the UAV reaches an apogee of a thrust event and wherein the show control system responds to the sensor output to trigger operation of the one or more show effect devices when the UAV is at the apogee to provide a show effect.

22. The system of claim 21, wherein the show effect is projecting light upon the UAV when at the apogee of the thrust event.

23. A system adapted for achieving dynamic participation in a distributed aerial show, comprising:
a ground-based show control system generating signals for triggering show effects based on a timeline defined for the distributed aerial show;
an unmanned aerial vehicle (UAV) moving in three dimensions in a show airspace based on a flight plan defined for the distributed aerial show;
one or more show effect devices physically separated from the UAV and operable in response to the triggering signals; and
one or more show effect devices physically on or supported by the UAV and operable in response to the triggering signals,
wherein the triggering signals are generated at times early or later than predefined effect times in the timeline to achieve synchronized interaction of the UAV with the one or more show effect devices separated from the UAV.

24. The system of claim 23, wherein the ground-based show control system generates the triggering signals based on timing of the UAV traveling to or through a location in the airspace with respect to the predefined effect times in the timeline and one or more mark locations defined for the UAV for the distributed aerial show.

25. The system of claim 23, further comprising a tracking device coupled to the ground-based show control system tracking a relative position of the UAV and the show effect devices physically separated from the UAV, wherein the relative position is used by the ground-based show control system to select a time for issuing the triggering signals.

26. The system of claim 25, wherein the relative position is used by the ground-based show control system to generate the triggering signals to cause the one or more show effect devices physically separated from the UAV to provide illumination or projections towards the UAV as the UAV is moved through the show airspace by the propulsion mechanism.

27. The system of claim 23, wherein the one or more show effect devices physically on or supported by the UAV provides light, video, or laser projection from the UAV to the one or more show effect devices physically separated from the UAV or wherein the one or more show effect devices physically separated from the UAV provides light, video, or laser projection on or toward the one or more show effect devices physically on or supported by the UAV.

* * * * *